(12) United States Patent
Andersson et al.

(10) Patent No.: US 6,400,966 B1
(45) Date of Patent: *Jun. 4, 2002

(54) BASE STATION ARCHITECTURE FOR A MOBILE COMMUNICATIONS SYSTEM

(75) Inventors: Rutger Andersson, Kista; Paul Teder, Täby; Torbjörn Karlsson, Lindome, all of (SE)

(73) Assignee: Telefonaktie Bolaget LM Ericsson (Publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/946,244

(22) Filed: Oct. 7, 1997

(51) Int. Cl.[7] .......................... H04M 1/00; H04B 1/212
(52) U.S. Cl. .................. 455/561; 455/452; 370/337
(58) Field of Search .................. 455/561, 560, 455/62, 436, 442, 450, 452, 464; 370/337, 331, 332

(56) References Cited

U.S. PATENT DOCUMENTS

| | | | | |
|---|---|---|---|---|
| 4,485,486 A | * | 11/1984 | Webb et al. | 455/450 |
| 4,638,479 A | * | 1/1987 | Alexis | 370/344 |
| 5,001,742 A | * | 3/1991 | Wang | 455/561 |
| 5,230,082 A | * | 7/1993 | Ghisler et al. | 455/438 |
| 5,307,371 A | * | 4/1994 | Juola | 375/133 |
| 5,432,780 A | * | 7/1995 | Smith et al. | 370/297 |
| 5,437,055 A | * | 7/1995 | Wheatley, III | 455/562 |
| 5,453,997 A | * | 9/1995 | Iv | 714/774 |
| 5,544,171 A | * | 8/1996 | Godecker | 370/337 |
| 5,564,025 A | * | 10/1996 | De Freese et al. | 710/110 |
| 5,590,404 A | * | 12/1996 | Sato et al. | 455/561 |
| 5,592,480 A | * | 1/1997 | Carney et al. | 370/347 |
| 5,603,089 A | * | 2/1997 | Searle et al. | 455/507 |
| 5,612,990 A | * | 3/1997 | Meier et al. | 455/466 |
| 5,625,876 A | * | 4/1997 | Gilhousen et al. | 370/331 |
| 5,655,003 A | * | 8/1997 | Erving et al. | 455/418 |
| 5,682,403 A | * | 10/1997 | Tu et al. | 375/200 |
| 5,768,268 A | * | 6/1998 | Kline et al. | 370/330 |
| 5,774,790 A | * | 6/1998 | Dupuy | 370/337 |
| 5,784,366 A | * | 7/1998 | Apelewicz | 370/342 |
| 5,852,651 A | * | 12/1998 | Fischer et al. | 379/56.2 |
| 5,887,021 A | * | 3/1999 | Keskitalo et al. | 375/200 |

(List continued on next page.)

FOREIGN PATENT DOCUMENTS

| | | |
|---|---|---|
| EP | 0869 629 A1 | 10/1978 |
| EP | 0439926 * | 8/1991 |
| WO | WO 95 33350 A | 12/1995 |
| WO | WO 96 38015 A | 11/1996 |
| WO | WO 97 29608 A | 8/1997 |
| WO | WO 97 32406 A | 9/1997 |
| WO | WO 98 13956 A | 4/1998 |

OTHER PUBLICATIONS

Standard Search Report for EPO RS 100381US dated Jul. 15, 1998.
International Search Report for PCT/SE 98/01805 dated Dec. 28, 1998.

Primary Examiner—Vivian Chang
Assistant Examiner—Charles N. Appiah
(74) Attorney, Agent, or Firm—Jenkens & Gilchrist

(57) ABSTRACT

A base transceiver station for a mobile communications system is disclosed, which is divided into a plurality of functional units that enables the signal processing resources to be flexibly allocated and cost-effectively implemented in hardware. A flexible communications interface is created between the base transceiver station units which allows the signal processing resources within the units to be used more efficiently. Essentially, the base transceiver station hardware is dimensioned to statistically distribute the signal processing resources among the different radio transmission services available. Consequently, the allocated base transceiver station hardware can be used more efficiently, which minimizes the overall size and weight of the base station.

16 Claims, 9 Drawing Sheets

U.S. PATENT DOCUMENTS

| | | | | |
|---|---|---|---|---|
| 5,903,841 A | * | 5/1999 | Kondo | 455/436 |
| 5,940,384 A | * | 8/1999 | Carney et al. | 370/347 |
| 5,956,332 A | * | 9/1999 | Rasanen et al. | 370/342 |
| 6,005,898 A | * | 12/1999 | Kaewell, Jr. | 375/341 |
| 6,011,785 A | * | 1/2000 | Carney et al. | 370/330 |
| 6,014,374 A | * | 1/2000 | Paneth et al. | 370/345 |
| 6,021,166 A | * | 2/2000 | Suzuki | 375/347 |
| 6,055,230 A | * | 4/2000 | Feuerstein et al. | 370/335 |

* cited by examiner

Interface A:

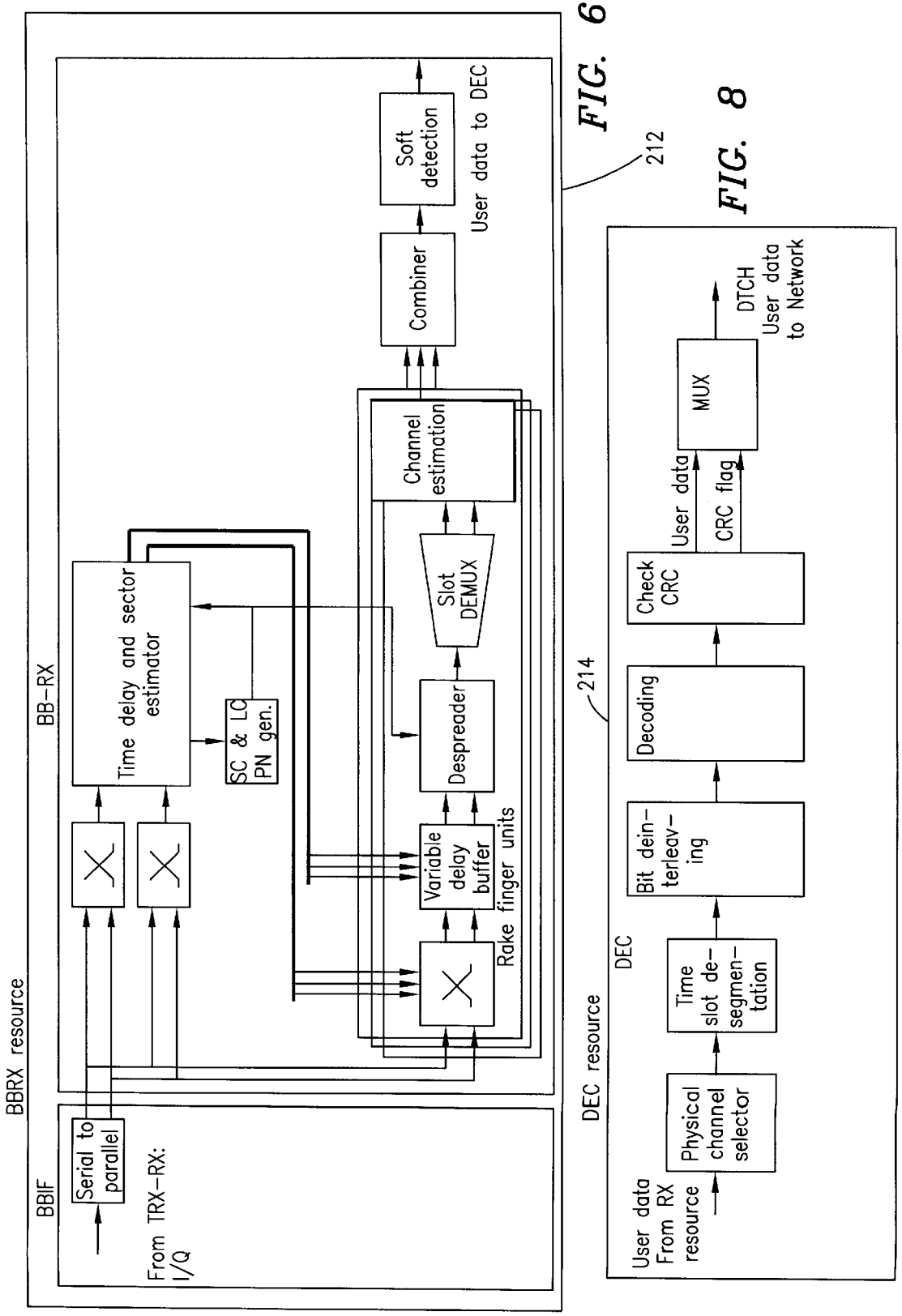

BASE STATION ARCHITECTURE FOR A MOBILE COMMUNICATIONS SYSTEM

BACKGROUND OF THE INVENTION

1. Technical Field of the Invention

The present invention relates in general to the mobile communications field and, in particular, to a base station architecture for a new generation of mobile communications systems.

2. Description of Related Art

The architecture used for any conventional mobile communications base station (BS) is a channel-based structure. FIG. 1 is a block diagram of such a conventional channel-based mobile communications BS 10. Essentially, as illustrated in FIG. 1, BS 10 allocates one of the fixed channel resources 12a(Ch.1-M1)-12N(Ch.2-M2) for each call. The baseband section of each channel is used to handle all of the possible radio transmission services available for a call, and the radio frequency (RF) section of each channel includes all of the RF resources needed for the call. Each BS sector (1–N) includes the maximum number of channel resources that will be needed for that sector over a period of time. Each sector's channel resources are combined for transmission and reception via a respective antenna subsystem (1–N).

A significant problem with the conventional channel-based structure described above is that it is limited to systems that provide relatively few different radio transmission services and the processing requirements for those different radio transmission services are virtually the same. However, in the rapidly expanding telecommunications field, numerous multimedia communication scenarios are being developed with a large number of different radio transmission services, with each such service having substantially different processing requirements. Consequently, from a purely statistical standpoint, there is a growing need for communications network operators to be able to provide all of the different radio transmission services for different users, and the appropriate capacity that will be needed for the different sectors involved.

For a conventional channel-based BS operating in a multimedia scenario with a fixed amount of resources allocated for each channel and sector, each BS channel will have to be equipped with the resources needed for the radio transmission service that imposes the highest requirement on that channel's processing capability. Also, in a multimedia scenario, each conventional BS sector will have to be equipped with the maximum resources that will be needed over time. Consequently, in the future, conventional channel-based BS hardware will be unrealistically dimensioned and thus provide a maximum processing capability that will far exceed what can be adequately supported by any future radio air interface. Therefore, for most of a conventional BS's operating time, a large portion of the BS's hardware will be unnecessarily allocated but unused, which will significantly and unnecessarily increase the overall size and weight of the BS.

The air interface to be used for a so-called "Third Generation" mobile communications system, such as, for example, a Wideband Code Division Multiple Access (W-CDMA) system, imposes a whole new set of requirements for a BS architecture compared to those set forth in previous standards. See, for W-CDMA, the "Report on FPLMTS Radio Transmission Technology Special Group (Round 2 Activity Report)," Version E 1.2, January 1997, Association of Radio Industries and Businesses (ARIB), FPLMTS Study Committee, JAPAN. Essentially, the Base Transceiver Station (BTS) for a third generation mobile communications system will have to be capable of handling such different end user services as voice, circuit-switched data, and packet-switched data. Also, the BTS will have to capable of supporting a number of different user data rates. For example, a third generation BTS will have to support voice signals at an 8 kbps rate, circuit-switched data from 64 kbps to 384 kbps, and packet-switched data from approximately 1 kbps to 160 kbps.

Furthermore, for a third generation BTS, separate protocols (encoding schemes) will be used to map users to a number of physical channels characterized by a symbol rate. An optimized encoding scheme will be used for each of the channels for maximum efficiency. A description of these protocols can be found in available documentation for W-CDMA. Thus, in a W-CDMA system, the same BTS should be capable of supporting different physical channels with a range of symbol rates between 16 ksps to 1024 ksps, and also be capable of handling multiple spreading rates. In fact, in order for the BTS to be capable of supporting very high user data rates, it also may have to support a number of chip rates. A third generation BTS will also have to be capable of supporting such a network function as "softer" handover (a handover where diversity is gained from two or more sectors corresponding to one BTS).

SUMMARY OF THE INVENTION

A BTS structured in accordance with the present invention is divided into a plurality of functional units which enables the signal processing resources to be flexibly allocated and cost-effectively implemented in hardware. Flexible communications interfaces are created between the BTS units which allows the signal processing resources within the units to be used more efficiently. Essentially, the BTS hardware is dimensioned to statistically distribute the signal processing resources among the different radio transmission services available. Consequently, the allocated BTS hardware can be used more efficiently, which minimizes the overall size and weight of the base station.

BRIEF DESCRIPTION OF THE DRAWINGS

A more complete understanding of the method and apparatus of the present invention may be had by reference to the following detailed description when taken in conjunction with the accompanying drawings wherein:

FIG. 6 is a detailed block diagram of a hardware BBRX sub-unit shown in FIG. 3;

FIG. 8 is a detailed block diagram of a DEC resource shown in FIG. 3;

DETAILED DESCRIPTION OF THE DRAWINGS

The preferred embodiment of the present invention and its advantages are best understood by referring to FIGS. 1–12 of the drawings, like numerals being used for like and corresponding parts of the various drawings.

Figure 1:
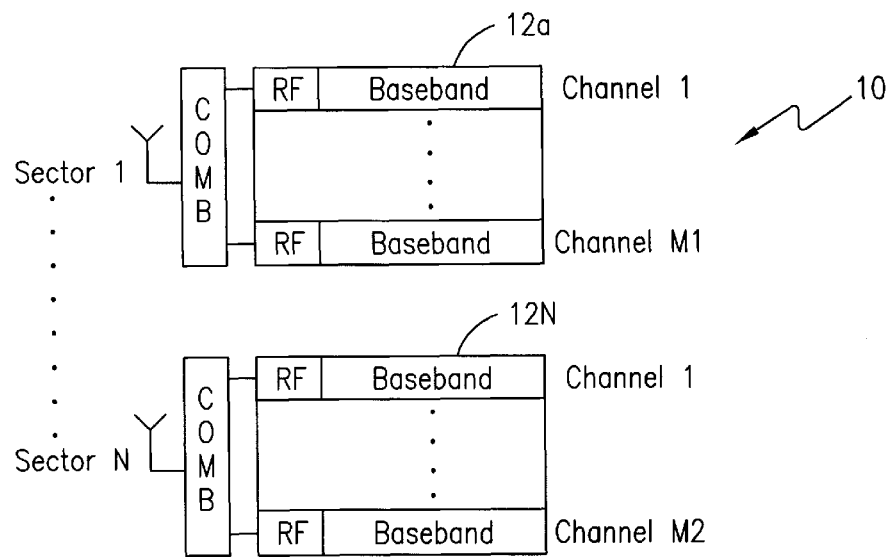
FIG. 1 is a block diagram of a conventional channel-based mobile communications base transceiver station.
Figure 2:
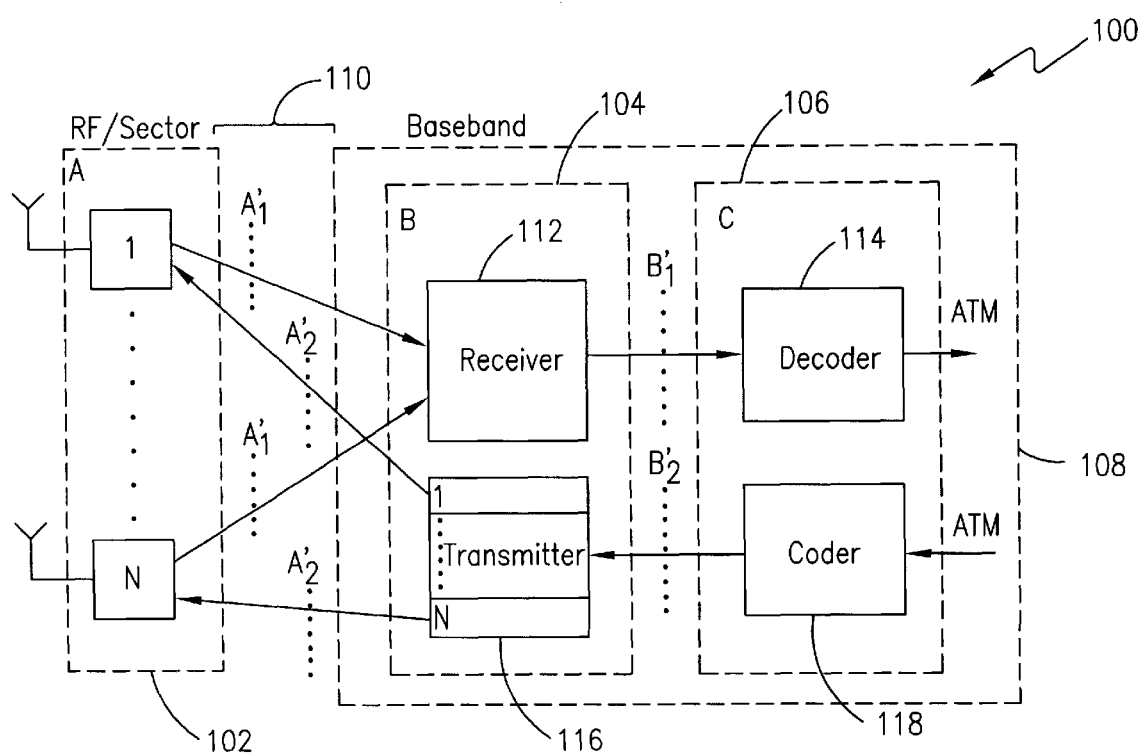
FIG. 2 is a simplified schematic block diagram of a base transceiver station for a mobile communications system, which is structured in accordance with a preferred embodiment of the present invention.

FIG. 2 is a simplified schematic block diagram of a BTS for a mobile communications system, which is structured in accordance with a preferred embodiment of the present invention. The exemplary BTS shown for the embodiment in FIG. 2 is for a W-CDMA system. However, the present invention is not intended, to be so limited and can be implemented for any type of mobile communications system in which functional flexibility in allocating communications resources is advantageous. Referring to FIG. 2, the BTS 100 shown is divided into three major functional units: RF/sector unit A (102); receiver-transmitter unit B (104); and coder-decoder unit C (106). Units B and C are functions included in the baseband section 108 of the BTS 100.

RF/sector functional unit A (102) includes all of the resources needed to convert modulation information from an RF signal to a baseband signal and vice versa. This RF-baseband conversion function of unit A is further divided into functional sub-units 1 to N. Each functional sub-unit 1 to N includes the RF-baseband conversion resources needed for one associated sector. In contrast with conventional systems, these conversion resources allotted for each sector are not associated with individual calls. These conversion resources allotted for each sector 1 to N are preferably dimensioned in terms of output power, bandwidth, number of diversity antennas, and the number of carriers to be conveyed within each sector. For example, from a functional and associated hardware standpoint, each sector sub-unit 1 to N can include a multi-carrier power amplifier (MCPA). As described in more detail below, this novel approach of concentrating the RF conversion resources for BTS 100 in functional sectors affords substantial savings in BTS hardware size and weight in comparison with the conventional base stations that distribute those resources on each physical channel.

The functions provided by receiver-transmitter functional unit B (104) and code-decoder functional unit C (106) operate at baseband, and include all of the resources needed for individual call setups, wherein each call can impose a different demand on the data rate for radio transmission services. As such, all of the communications resources in functional units B and C can be used for any of the radio transmission services provided.

BTS 100 includes a novel connection interface A' (110) between RF/sector functional unit A (102) and receiver-transmitter functional unit B (104). Interface A' (110) enables any of the communications resources included within functional units B (104) and C (106) (e.g., allocated for a specific radio transmission service) to be allocated to any of the sectors 1 to N. Consequently, the baseband hardware associated with functional units B (104) and C (106) can be dimensioned to handle the maximum load of the overall BTS, instead of the maximum load of each sector.

In order to enhance the flexible allocation of resources and thereby significantly reduce the size of the hardware in BTS 100, the baseband section's (108) functional units B (104) and C (106) include the capability to freely allocate the baseband resources in accordance with the needs of the radio transmission service capabilities required for a specific call. The baseband section's (108) functional units also include the capability of freely allocating the baseband resources for uplink and downlink processing of asymmetrical radio transmission services.

As shown in FIG. 2, the baseband section (108) includes four functional units: a receiver unit 112 and decoder unit 114 for uplink traffic; and a transmitter unit 116 and coder unit 118 for downlink traffic. Preferably, the hardware associated with the baseband section 108 can be allocated between those four functions on a call by call basis. Alternatively, this hardware can be reallocated on a recurring basis (e.g., once every 24 hours) in order to better follow the fluctuations of the service mix.

Specifically, for the uplink signals, the receiver unit 112 functions to separate the modulation information from the RF/sector unit 102 into user specific channels, by multiplying the input signal from RF/sector unit 102 by user specific short and long codes. At the same time, the receiver unit 112 functions to demodulate the input signal and detects the data from the resulting signal. The decoder unit 114 deinterleaves the input data and performs channel decoding. Using an Asynchronous Transfer Mode (ATM) protocol, the output signal from decoder unit 114 is coupled via a transmission line interface to an output for further processing and/or display.

For the downlink signals, using an ATM protocol, input data is coupled via a transmission line interface from an input to the coder unit 118, where the data is channel coded and interleaved. The coded data is coupled to the transmitter unit 116 and multiplied with a user-specific short code, which can be different for each sector/frequency. At the same time, the transmitter unit defines the modulation to be used. Also, as described below, the user-specific spreaded data from different users are added sectorwise, and thereafter multiplied with a sector/frequency-specific long code.

As described earlier, the baseband section 108 is divided into two functional units B (104) and C (106), which eases the implementation of more flexible resource allocation hardware. One important reason for dividing the baseband section 108 as shown in FIG. 2 is that the two functional units B and C have quite different functional structures and implementation technologies. For example, the transmitter unit 116 and receiver unit 112 operate with chip rates in the range of the RF bandwidth for the BTS. The processing hardware to implement such functional capabilities is preferably field-programmable gate arrays (FPGAs) or Application Specific Integrated Circuits (ASICs), rather than digital signal processors (DSPs). On the other hand, the processing in the coder unit 118 and decoder unit 114 is accomplished at a symbol rate, or at about a 10–100 times lower rate than the transmitter/receiver units. This lower rate processing in the coder/decoder allows a designer to more freely choose an implementation technology. Notably, considering the opportunity to integrate the associated hardware on a stepwise basis, it is advantageous to separate the functional units in block B (104) from those in block C (106).

Another important reason for dividing the baseband section 108 as shown is that the functional units in blocks B (104) and C (106) have different pooling potentials. For example, the transmitter unit 116 in block B includes channel resources whose processing requirements are independent of the data rate of the radio transmission services being processed. The processing requirements of the receiver unit 112 in block B are also independent of the radio transmission services' data rates, but in this case, at higher data rates, the processing requirements of the receiver unit 112 can be scalable to the data rate of a particular radio transmission service involved.

On the other hand, the coder unit 118 and decoder unit 114 in block C includes channel resources whose processing requirements are fully scalable to the data rate of the radio transmission service involved. Therefore, in this case, the scalability of the functional units in block C (106) is facilitated by separating the functions of block C from those in block B (104).

Additionally, many of the multimedia radio transmission services being provided have asymmetrical characteristics with respect to the others, and these different characteristics can vary over time. In such an environment, the transmitter and receiver resources in functional block B (104) and the coder and decoder resources in functional block C (106) can be more flexibly and efficiently utilized in processing these asymmetrical services, because these resources can be freely allocated for uplink or downlink processing, either on a per call or recurring (e.g., 24 hour) basis.

However, as illustrated by the exemplary embodiment shown in FIG. 2, the resources utilized for uplink and downlink signal processing are allocated to different physical (hardware) units in blocks B (104) and C (106). Since the exemplary BTS shown in FIG. 2 is for a W-CDMA system, the resources needed for downlink signal processing can be 5–10 times smaller and less complex than the resources needed for uplink signal processing. Consequently, separating the uplink and downlink signal processing functions in the BTS 100 shown in FIG. 2 does not affect to a significant degree its uplink and downlink resource allocation flexibility, but instead advantageously facilitates the stepwise hardware integration of each functional unit shown.

Notably, a novel aspect of the BTS 100 shown in FIG. 2, which is a BTS architecture that can be implemented for a W-CDMA system (but can also be applied to a BTS for a CDMA system), because of the transmitter unit's (116) relatively low complexity, the transmitter hardware that can be utilized has a small impact on the overall size of the BTS. Consequently, the transmitter unit's (116) individual hardware resources can be allocated for each sector/frequency, up to the maximum capacity that can be handled in accordance with the W-CDMA air interface specification.

For "softer" handovers, the same data can be transmitted in a plurality of the N possible sectors. This data in different sectors can be spread by different short codes (and a sector-specific long code), which advantageously allows pooling of the spreading hardware resources by sectors in BTS 100. Consequently, by being able to sector pool the transmitter's (116) hardware resources, the data rate of the interface $A'_2$ (described in detail below) can be significantly reduced in comparison with conventional approaches that utilize a pool of spreaders for the whole BTS.

In accordance with the preferred embodiment of the present invention, the capability of flexibly allocating processing resources in BTS 100 can be provided as follows. Each channel resource allocated for uplink signal processing in the receiver unit 112 can simultaneously receive signals from different sectors (1 to N) of the RF/sector unit 102. Consequently, the receiver unit 112 can dynamically select which input signals to process at any one point in time. This capability allows flexible capacity for each sector at call setup. For "softer" handovers during a call, this capability gives significant savings in hardware volume. In other words, the same receiver resources can be used during the whole "softer" handover operation. As such, during "softer" handovers or similar operations, the BTS 100 is not required to reallocate or double allocate the receiver's signal processing resources.

Specifically, the communications interface $A'_1$ between the RF/sector section 102 and the receiver unit 112 provides a significant portion of the resource allocation flexibility for BTS 100. The interface $A'_1$ comprises a separate high speed serial connection from each RF/sector resource in section 102 to the common receiver unit 112. The serial connections are made through interfaces transferred to a high speed parallel bus, which carries all of the incoming sector information to the receiver unit 112.

The signal processing resources in the decoder unit 114 can be freely allocated to any resource in the receiver unit 112. This resource allocation flexibility for the decoder is accomplished through the communications interface $B'_1$, which comprises a number of moderately-high speed time-slotted serial buses connected between the receiver unit 112 and the decoder unit 114. Each signal processing resource in the receiver unit 112 can place data on a specific time-slot on one of the buses, and the BS manager (e.g., an operating system not explicitly shown) directs a signal processing resource in the decoder unit just where to fetch the data from that slot on the bus.

The decoder unit 114 provides flexible allocation of hardware resources to different radio transmission services for different calls. In other words, a high speed data rate service can utilize the same decoder unit (114) resources that had been previously utilized for speech calls. For example, the same decoder unit (114) hardware can process 100 calls at 8 kbps (data rate) each, as 8 calls at 100 kbps each. This capability of pooling the decoder resources in BTS 100 significantly reduces the size of the decoder hardware that can be used.

For downlink signal processing, the signal processing resources in the coder unit 118 can be flexibly allocated to handle different radio transmission services in essentially the same way as they are handled in the decoder unit 114. Consequently, this capability of pooling the signal processing resources in the coder unit 118 significantly reduces the size of the coder hardware that can be used.

Specifically, by using the interface $B'_2$, a user-specific signal processing resource in the coder unit 118 can be allocated to any sector in the transmitter unit 116, since the transmitter unit's resources are sector/frequency allocated. The communications interface $B'_2$ between the coder unit 118 and transmitter unit 116 is a moderately-high speed time-slotted serial/parallel bus. Consequently, each signal processing resource in the coder unit 118 can place data on a specific time-slot on the bus, and the BS manager can direct a signal processing resource in the transmitter unit 116 just where to fetch the data from that slot on the bus.

In general, this downlink functional capability in the baseband section 108 of BTS 100 provides a significant amount of flexible capacity per sector. For "softer" handover functionality on the downlink, this capability facilitates the "softer" handover operation and saves substantial baseband hardware resources. The same coder unit signal processing resources can be mapped to the transmitter unit's resources simultaneously for an unlimited number of sectors (1 to N). Consequently, the BTS 100 shown in FIG. 2 is not required to reallocate or double allocate the signal processing resources of the coder unit 118 during the complete "softer" handover (or other similar) operations.

The output of each sector-allocated signal processing resource in transmitter unit 116 is coupled via communications interface A'$_2$ to a corresponding signal processing resource in the RF/sector section 102. The communications interface A'$_2$ is preferably implemented by N point-to-point high speed serial interface connections.

In general, with the BTS 100 shown in FIG. 2, in order to appropriately handle the processing of asymmetric radio transmission services, the uplink and downlink signal processing resources in BTS 100 can be allocated independently at call set up or during a call. In other words, the BTS 100 can flexibly increase or decrease the uplink and downlink signal processing resources being used during a call. For example, for processing high data rate radio transmission services, the BS manager can have BTS 100 allocate several parallel channel resources for the uplink and/or downlink to a call. For the downlink allocation, incoming user data to the coder unit 118 can be mapped to several of the coder unit's signal processing resources, and the output of each such resource can be mapped to a specific short code per sector/frequency in the transmitter unit 116.

A significant advantage of the BTS 100 shown in FIG. 2 and described above in accordance with the present invention is that the architecture makes it possible to minimize the hardware size for a given radio transmission service mix. For example, if the dominant calls being processed are speech calls with low data rates, many receiver resources will be needed, but less decoding and coding resources will be needed. On the other hand, the opposite is true if the dominant calls being processed are data calls with high data rates, because many coding and decoding resources will be needed, but less receiver resources will be needed. Consequently, the present invention makes it possible for an operator to optimally and cost-effectively outfit the BTS with the appropriate hardware resources, in accordance with a predicted radio transmission service mix.

The hardware size of the BTS 100 can also be optimized to process asymmetric traffic on the uplink and downlink. For example, if more downlink than uplink traffic is being processed by the BTS, then more signal processing resources in the coder unit 118 are needed, and less resources in the receiver unit 112 and decoder unit 114 are needed. Consequently, an operator can equip the BTS (100) with uplink and downlink signal processing resources based on a predicted future need.

For the baseband section 108 of the BTS, a number of different factors can come into play when determining the maximum amount of signal processing resources that can be allocated to a specific function. For example, the number of channel resources in the receiver unit 112 is limited to N (number of sectors) times the number of speech channels per sector that can be supported by the air interface. The number of resources per sector in the transmitter unit 116 is limited by the number of orthogonal spreading codes used. The maximum number of resources in the decoder unit 114 is limited to N (number of sectors) times the number of resources needed within a sector for the maximum total data rate within a sector; scalable between the radio transmission services.

The number of resources in the coder unit 118 is limited similar to the limitations for the decoder unit 114 described above. However, the potential maximum data rate for the coder unit 118 is higher than that for the decoder unit, because of the orthogonality of the downlink signals.

Figure 3:
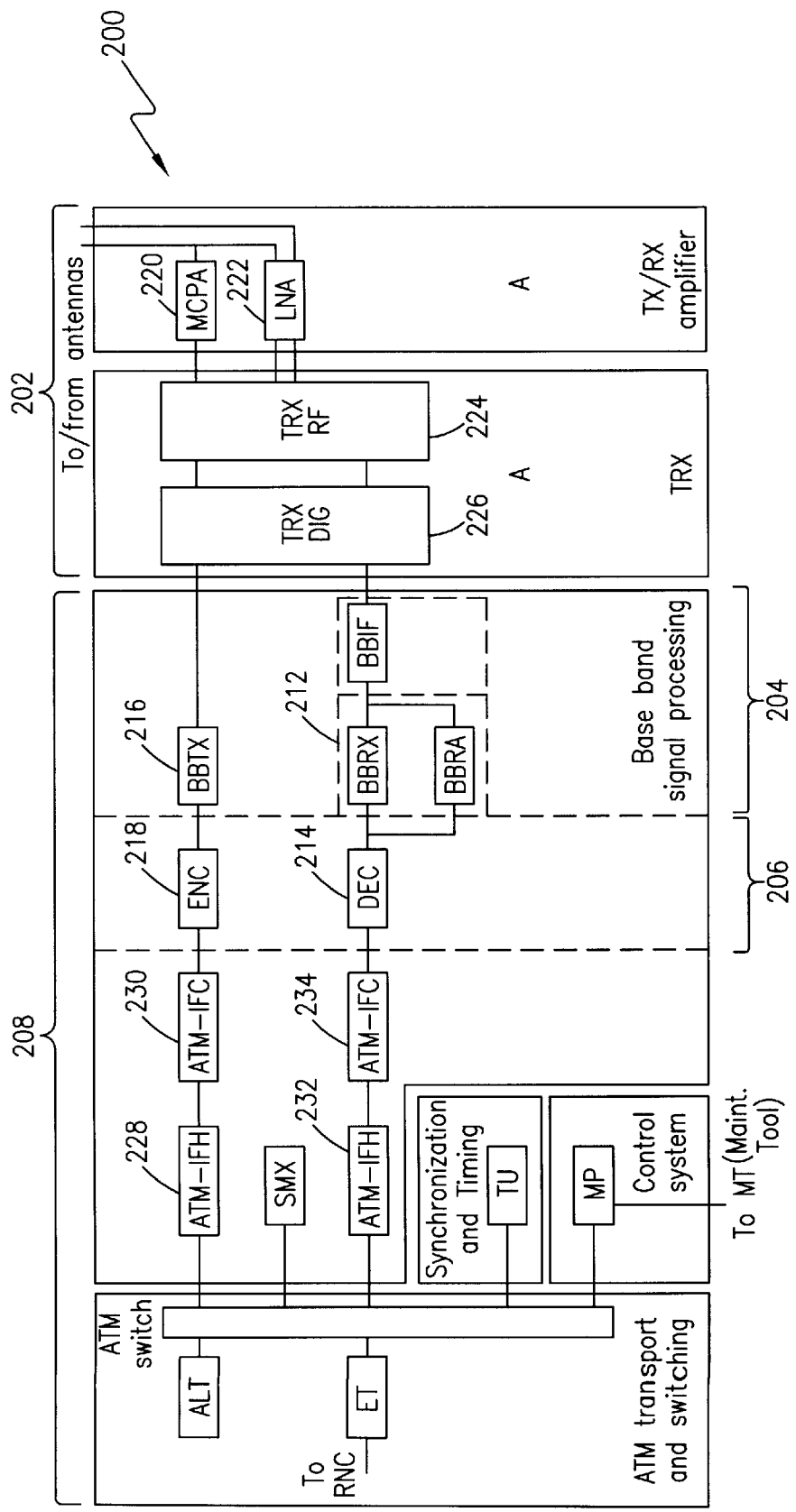
FIG. 3 is a block diagram that illustrates exemplary hardware that can be used to implement the functions of BTS 100 shown in FIG. 2.

FIG. 3 is a block diagram that illustrates exemplary hardware that can be used to implement the functions of BTS 100 shown in FIG. 2. A BTS 200 includes RF/sector unit 202 and baseband section 208. For this embodiment, RF/sector unit 202 shown in FIG. 3 is one sub-unit out of a possible N sub-units within RF/sector functional unit A (102) shown in FIG. 2. In other words, the signal processing resources in RF/sector unit 202 are the hardware resources for one sector. For the exemplary embodiment shown in FIG. 3, these sector hardware resources include a transmitter MCPA 220, a receiver low noise amplifier (LNA) 222, a transceiver RF part 224, and a transceiver digital part 226.

The hardware resources for the baseband unit 208 include one of the plurality of baseband transmitter sub-units BBTX in the transmitter unit 216, and one of the plurality of baseband receiver sub-units BBRX in the receiver unit 212. The sub-unit BBTX includes all of the transmitter resources for a sector (1 to N) for all carrier frequencies within that sector. The receiver unit 212 also includes one of the plurality of baseband random access sub-units BBRA, and one of the plurality of baseband interface sub-units BBIF. The BBRA sub-unit controls the uplink accesses for the BTS's control channel. The BBIF sub-unit forms part of interface A'$_1$. These baseband receiver and transmitter sub-units in hardware unit 204 correspond to the functional receiver and transmitter units of unit 104 in FIG. 2.

The baseband hardware unit 208 also includes one of a plurality of decoder sub-units DEC (214) and encoder sub-units ENC (218). These DEC and ENC sub-units perform the respective decoder and encoder functions of the sub-units 114 and 118 shown in FIG. 2.

A timing unit (TU) supplies synchronization and timing signals for all of the hardware units in BTS 200. A main processor (MP) manages the resource allocation for all of the hardware units in the BTS.

For downlink data flow through BTS 200, user data is input from the transmission line interface towards the Radio Network Controller (RNC) and coupled through the exchange terminal (ET) ATM to an AAL2 link termination (ALT) and on to a service multiplexer (SMX). The data is then passed by the SMX to an ATM interface host (ATM-IFH) sub-unit 228 and on to an ATM interface client (ATM-IFC) sub-unit 230. The data is then coupled to the ENC sub-unit 218, where the data is channel coded and interleaved. The channel coded data is then coupled to the BBTX sub-unit, where the data is multiplied with a user-specific short code. The user-specific (spread) data are added sector-wise and multiplied with a sector/frequency-specific long code. The encoded signal is then coupled through the transceiver digital part 226, the transceiver RF part 224, and the MCPA to the transmit antenna.

For uplink data flow through BTS 200, the incoming signal from the receive antenna is coupled through the low noise amplifier 222, the transceiver RF part 224, and the transceiver digital part 226 to the BBIF sub-unit. The BBIF forms a part of interface A'$_1$ in FIG. 2. The incoming signal is coupled to the BBRX sub-unit, which separates the modulation information in the incoming signal into user-specific channels by multiplying the incoming signal by user-specific short and long codes. The BBRX sub-unit also demodulates the incoming signal and detects the data from the resulting demodulated signal. The data is then coupled to the DEC sub-unit 214, which deinterleaves the incoming data and performs channel coding. The decoded data are then coupled by the ATM-IFC 234 to the ATM-IFH 232. The data are then coupled to the ALT, where the SMX couples the data to the ET and out over the transmission line interface towards the RNC for display.

Figure 4A:
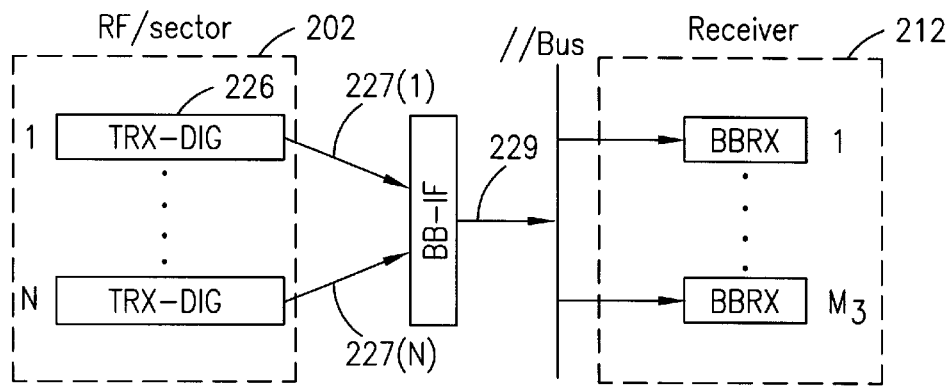
FIGS. 4A and 4B are diagrams that illustrate the flexible allocation of signal processing resources utilizing the interface $A'_1$ shown in FIG. 2, in accordance with the preferred embodiment of the present invention.
Figure 4B:
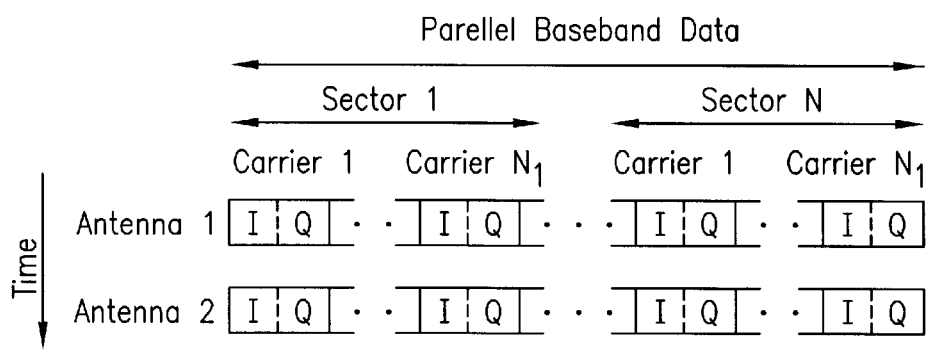
Figure 5:
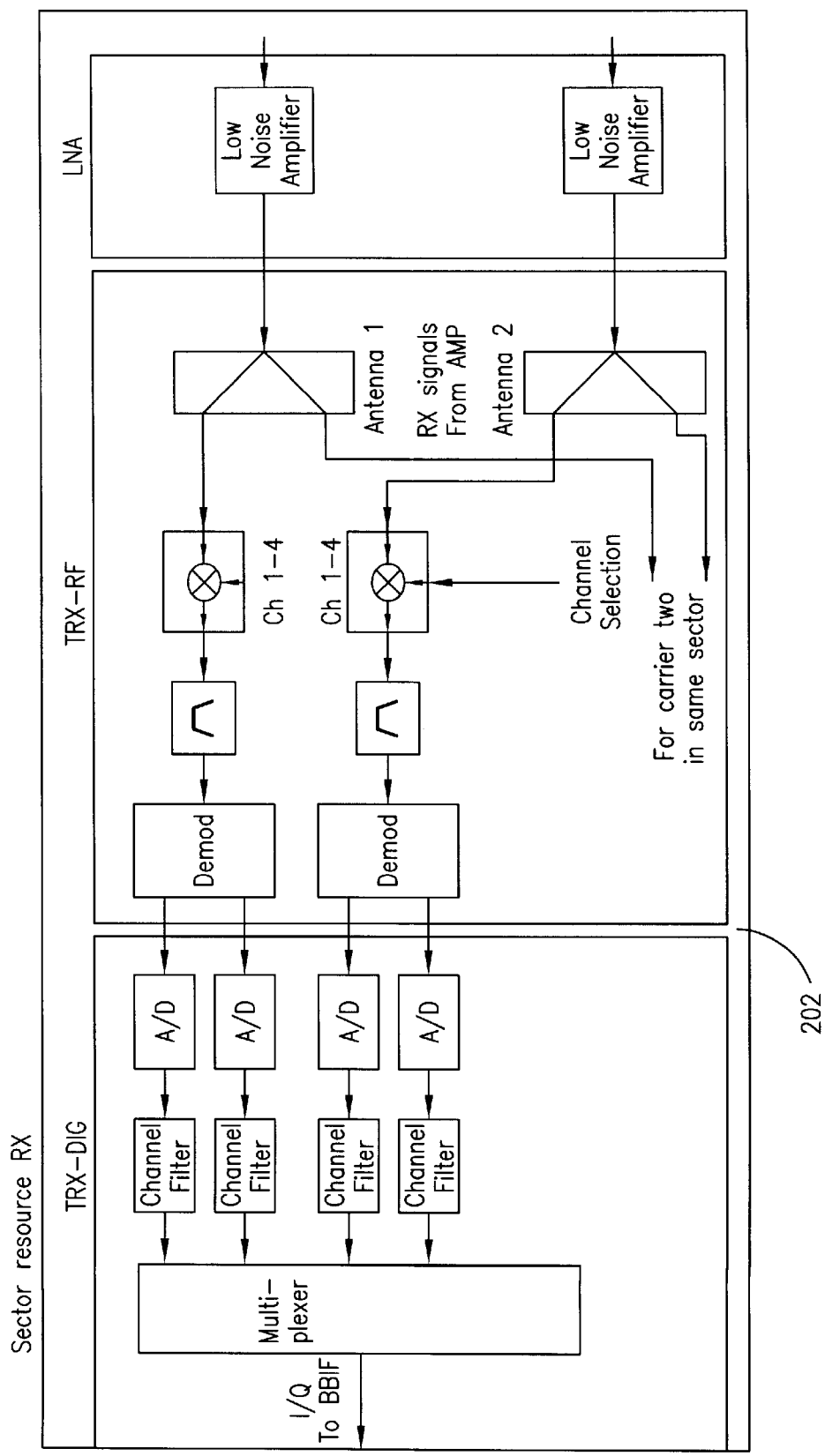
FIG. 5 is a detailed block diagram of an RF/sector resource RX sub-unit shown in FIG. 3.

FIGS. 4A and 4B are diagrams that illustrate the flexible allocation of signal processing resources utilizing the interface $A'_1$ shown in FIG. 2, in accordance with the preferred embodiment of the present invention. As shown in the detailed block diagram of an RF/sector resource sub-unit 202 in FIG. 5, from each RF/sector resource TRX-DIG 226 (1–N) in FIG. 4A, there is a high speed serial connection 227 (1–N) to a baseband interface sub-unit BBIF. The high speed connection 227 and BBIF are both parts of the interface $A'_1$. This BBIF transfers the serial connections into one high speed parallel bus 229 that carries information from all sectors (1–N).

Within the baseband receiver unit 212, there is a plurality of hardware BBRX sub-units, as shown by the detailed block diagram of FIG. 6. Each such BBRX sub-unit includes a plurality of BBRX signal processing resources. By a plurality of selectors on the input of each BBRX resource, one of these plurality of resources can access I and Q information from any combination of the carrier, sector, and diversity antenna signals. During a "softer" handover operation, one BBRX resource processes information from one carrier signal, but from different sectors or antennas. The I and Q information contains modulation information from many radio paths, with different multipath delays, entering a sector/antenna. The BBRX signal processing resource can dynamically choose any of the paths from any sector, and simultaneously process these paths. FIG. 4B illustrates how the I and Q information from different sectors, carriers and antennas are mapped onto the parallel bus 229 by the BBIF sub-unit.

Figure 7A:
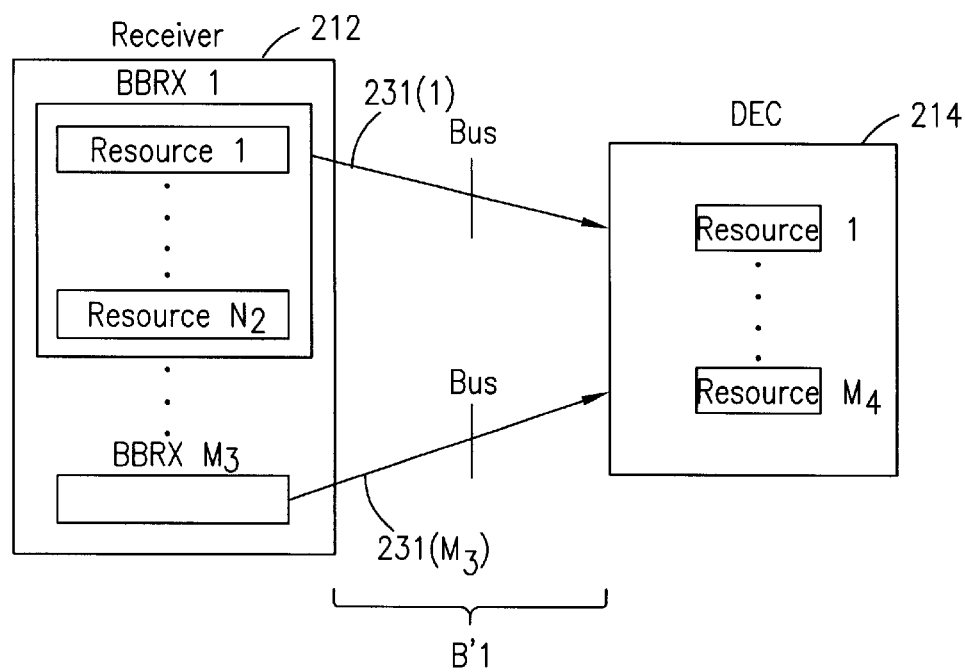
FIGS. 7A and 7B are diagrams that illustrate the flexible allocation of signal processing resources utilizing the interface $B'_1$ shown in FIG. 2, in accordance with the preferred embodiment of the present invention.
Figure 7B:
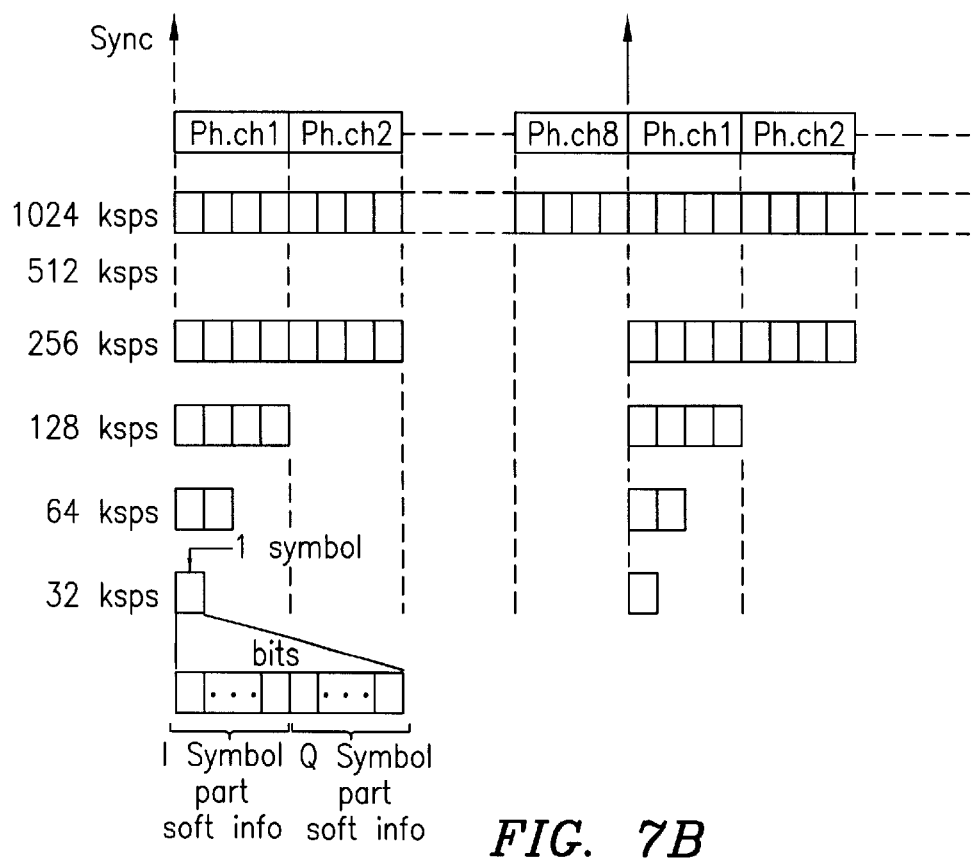

FIGS. 7A and 7B are diagrams that illustrate the flexible allocation of signal processing resources utilizing the interface $B'_1$ shown in FIG. 2, in accordance with the preferred embodiment of the present invention. As shown in FIG. 7A, from each BBRX sub-unit in receiver unit 212, there is a serial bus connection 231 (1–$M_3$) to each DEC hardware sub-unit 214 that carries I and Q soft information data from all physical channel/BBRX resources within a BBRX hardware sub-unit. Each BBRX resource occupies one physical channel-slot on the bus 231. This time-slot can carry three different symbol rates (e.g., 32, 64 and 128 ksps). For symbol rates of 256, 512 or 1024 ksps, two, four or eight consecutive time-slots are used. As shown by FIG. 7B, this bus structure facilitates the extraction of data by a physical channel selector in the DEC resource shown in the detailed block diagram of FIG. 8. Each DEC resource within the DEC hardware sub-unit 214 can access all of the physical channel slots on all of the serial buses 231 (1–$M_3$) shown in FIG. 7A.

Figure 9A:
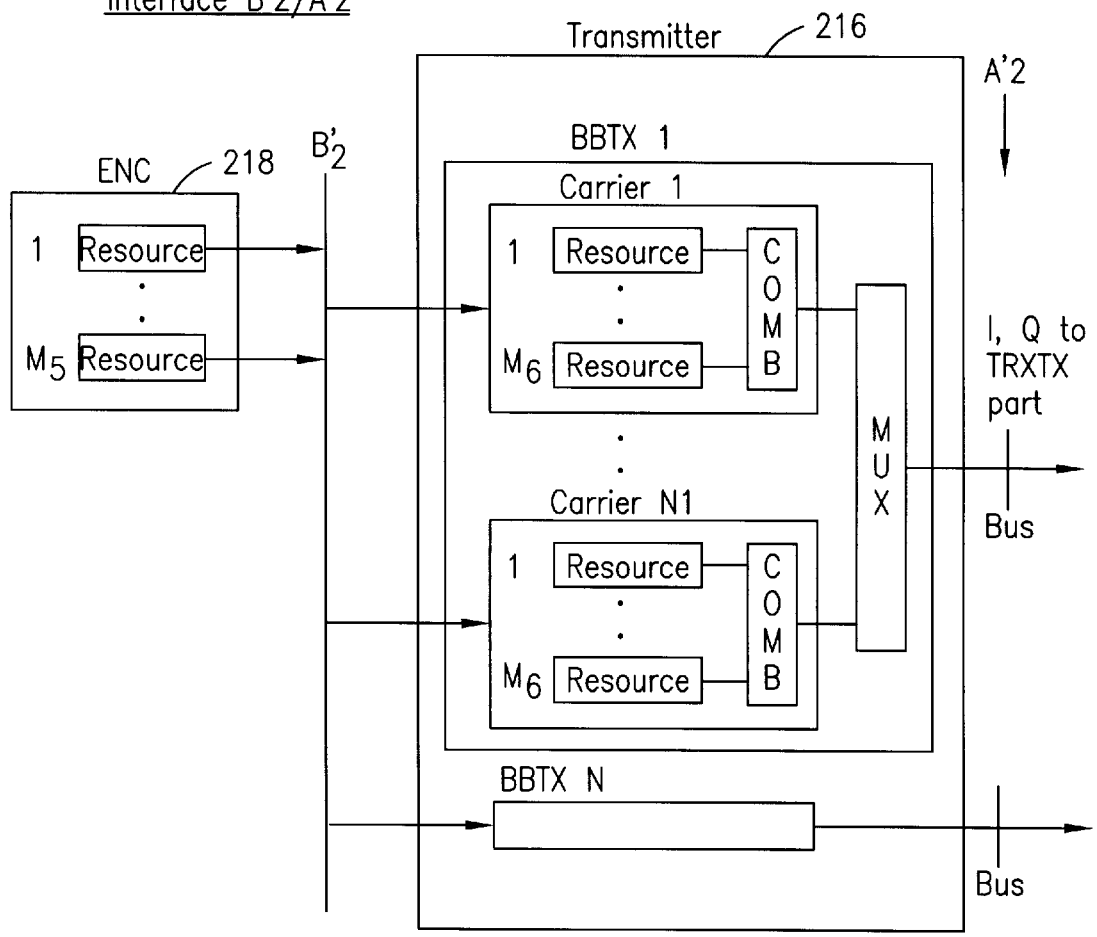
FIGS. 9A and 9B are diagrams that illustrate the flexible allocation of signal processing resources utilizing the interfaces $B'_2$ and $A'_2$ shown in FIG. 2, in accordance with the preferred embodiment of the present invention.
Figure 9B:
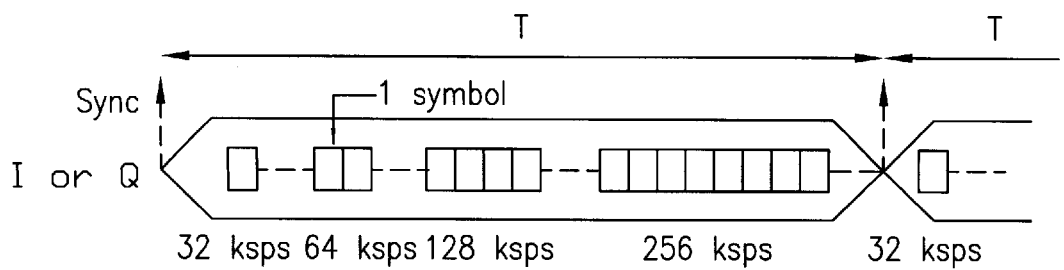
Figure 10:
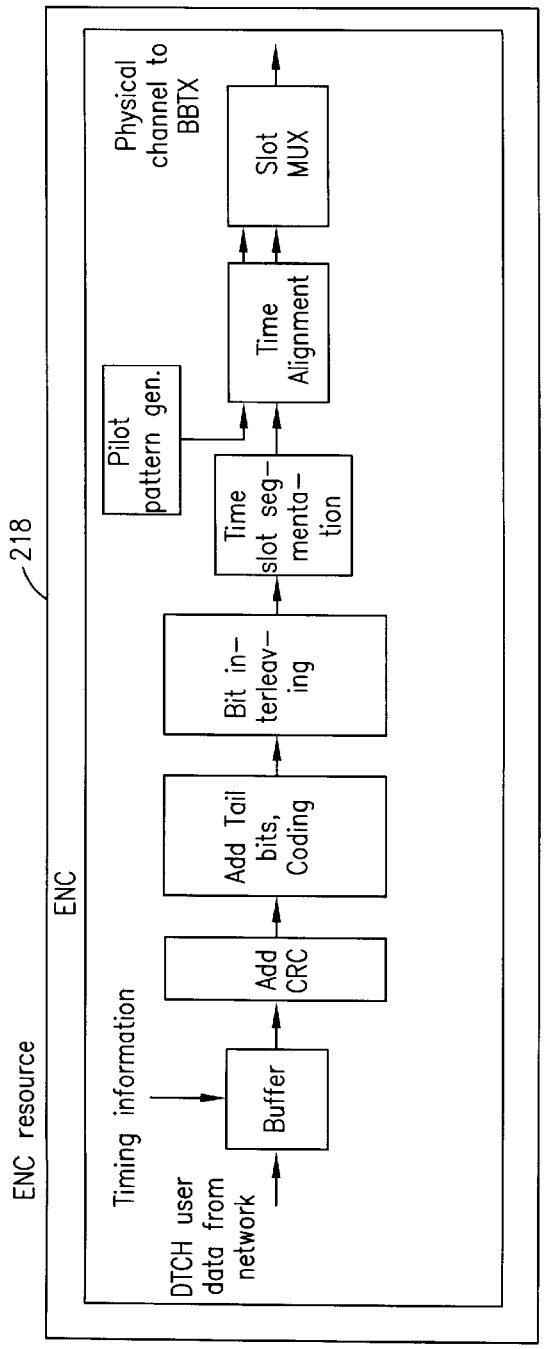
FIG. 10 is a detailed block diagram of an ENC resource shown in FIG. 3.

FIGS. 9A and 9B are diagrams that illustrate the flexible allocation of signal processing resources utilizing the interfaces $B'_2$ and $A'_2$ shown in FIG. 2, in accordance with the preferred embodiment of the present invention. FIG. 9A shows that each ENC resource (as shown in the detailed block diagram of FIG. 10) in the ENC hardware sub-unit 218 can map its information on a time-slotted serial bus ($B'_2$). For this embodiment, there are two parallel buses for I and Q information, respectively. During time T (FIG. 9B), each ENC resource can map a plurality of consecutive symbols onto the bus $B'_2$. For the example shown in FIG. 9B, the number of consecutive symbols is 1, 2, 4 and 8 for symbol rates of 32, 64, 128 and 256 ksps, for different ENC resources (such as the one in the detailed block diagram in FIG. 10). The order in which the different symbol rates are allocated is determined by the resource allocations from the main processor shown in FIG. 3.

Figure 11:
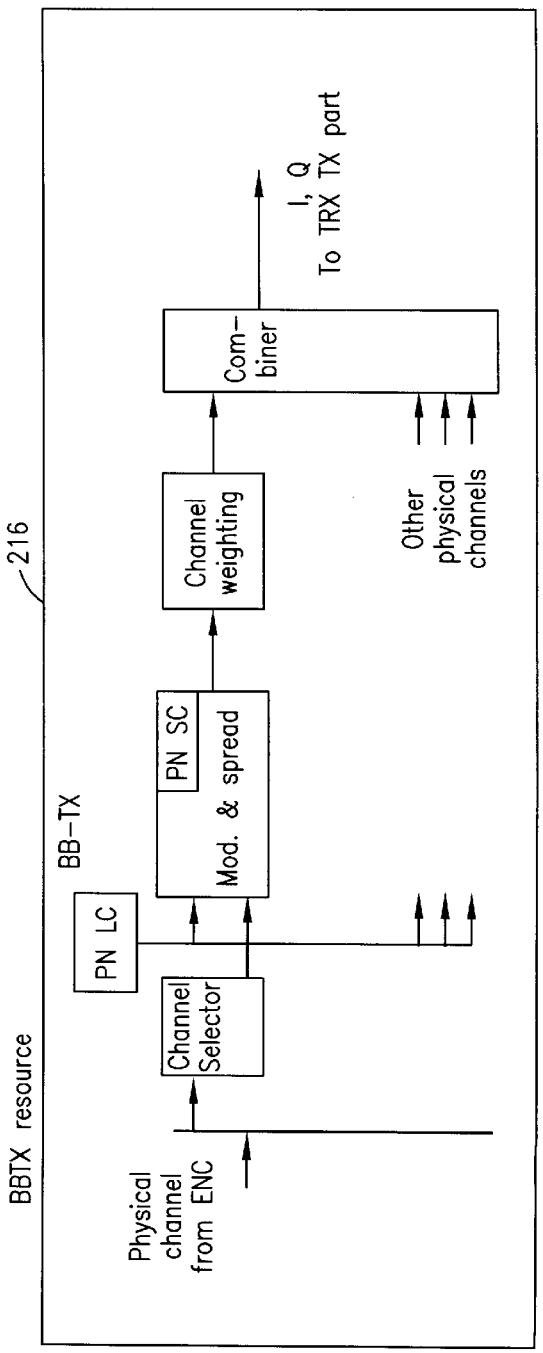
FIG. 11 is a detailed block diagram of a BBTX resource shown in FIG. 3.
Figure 12:
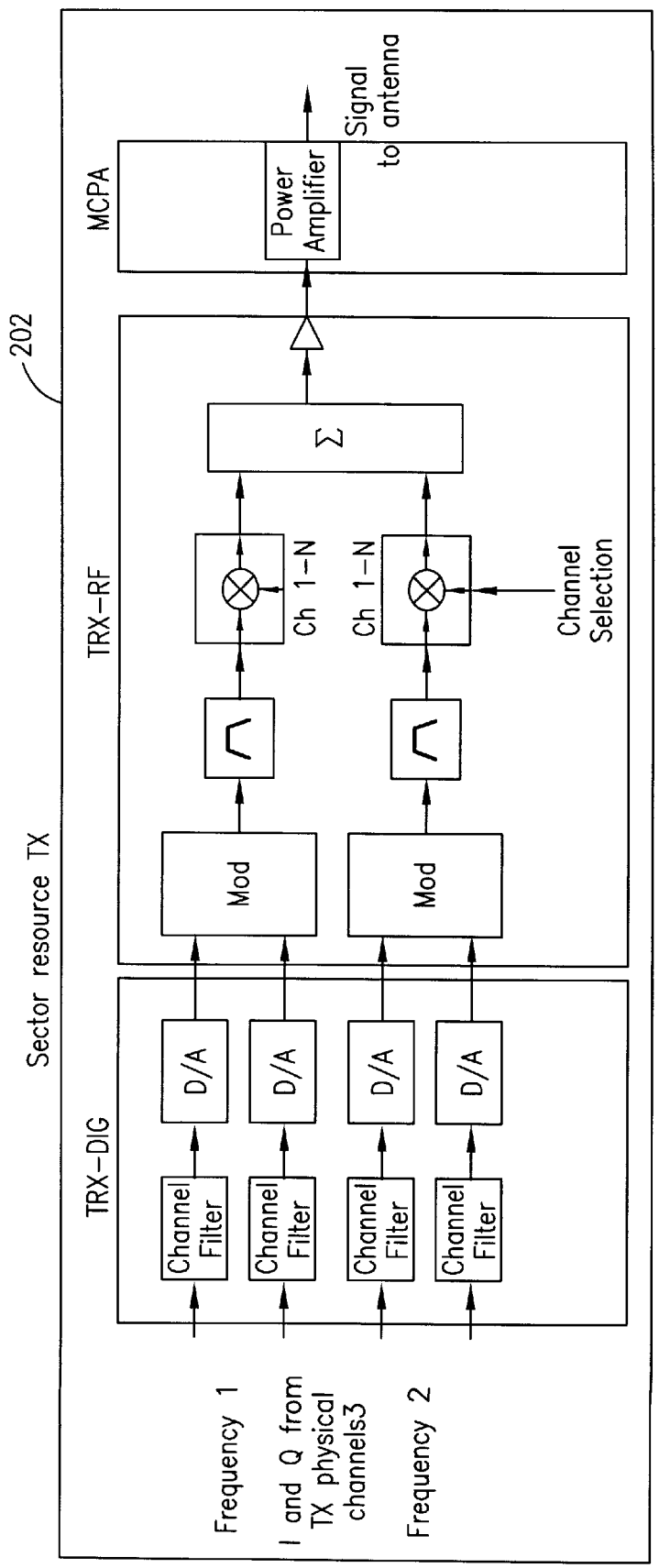
FIG. 12 is a detailed block diagram of an RF/sector resource TX shown in FIG. 3.

Each BBTX sub-unit (216) hardware resource, as shown in FIG. 11, can access any ENC resource (FIG. 10) mapped onto the bus $B'_2$. During a "softer" handover operation, information from one ENC resource (FIG. 10) can be mapped to BBTX resources on different BBTX hardware sub-units, thus resources can be utilized on different sectors but for the same carrier.

In FIG. 9A, the BBTX hardware sub-unit (216) has a separate pool of BBTX resources for each carrier. For this embodiment, these resources are combined into an I and Q information/carrier. Within the BBTX sub-unit (216), the information from different carriers are then multiplexed (MUX) into the data bus $A'_2$ that can provide point-to-point connection with corresponding RF/sector resources, such as the RF/sector resource (TX) shown in the detailed block diagram of FIG. 12. For this embodiment, there are N such connections.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A base station for a mobile communications system, comprising:
    an RF signal processing unit;
    a baseband signal processing unit comprising a transmit unit, a receive unit, and signal processing resources including a coder unit and a decoder unit;
    a first signal interface, comprising a pair of signal interfaces coupled between said signal processing resources and said transmit unit and said receive unit of said baseband signal processing unit, one of said pair of signal interfaces coupled between said receive unit and said decoder unit for flexibly allocating signals between resources of said receive unit and said decoder unit, and the other of said pair of signal interfaces coupled between said transmit unit and said coder unit for flexibly allocating signals between resources of said transmit unit and said coder unit, each one of said pair of signal interfaces comprising a plurality of moderately-high speed time-slotted serial buses; and
    a second signal interface coupled between said RF signal processing unit and said baseband signal processing unit for flexibly allocating resources of said RF signal processing unit to any resource of said baseband signal processing unit.

2. A base station for a mobile communications system, comprising:
    an RF signal processing unit;
    a baseband signal processing unit adapted to communicate with said RF signal processing unit, said baseband signal processing unit comprising a transmit unit, a receive unit and signal processing units, said signal processing units including coding/interleaving resources and decoding/deinterleaving resources; and
    a first signal interface coupled between said signal processing units and said transmit unit and said receive unit for flexibly allocating said coding/interleaving resources and said decoding/deinterleaving resources of said signal processing units between resources of said transmit unit and said receive unit to service a call, said first signal interface comprising a plurality of time-slotted serial buses.

3. The base station of claim 1 or 2, wherein said mobile communications system comprises a W-CDMA system.

4. The base station of claim 1 or 2, wherein said mobile communications system comprises a CDMA system.

5. The base station of claim 1 or 2, wherein said mobile communications system comprises a TDMA system.

6. The base station of claim 1 or 2, wherein an unequal allocation of said signal processing resources is allocated between uplink traffic and downlink traffic.

7. The base station of claim 1 or 2, wherein processing requirements for said signal processing resources are fully scalable to support an overall need for data rates of radio transmission services.

8. The base station of claim 1 or 2, wherein said signal processing resources are dimensioned to accommodate a maximum overall demand for processing resources on said base station.

9. The base station of claim 1, wherein said coder unit and said decoder unit further comprise a plurality of coder and decoder sub-units respectively, wherein said transmit unit and said receive unit further comprise a plurality of transmit and receive sub-units respectively, and wherein any one or more of said coder and decoder sub-units may be coupled to any number of said transmit and receive sub-units respectively through said first signal interface.

10. The base station of claim 9 wherein said first signal interface comprises a plurality of time-slotted serial buses coupled between said receive sub-units and said decoder sub-units, and a plurality of serial/parallel buses coupled between said transmit sub-units and said coder sub-units.

11. The base station of claim 10, wherein any combination of said transmit and said coder sub-units, and any combination of said receive and decoder sub-units are configured to be coupled to support uplink traffic and downlink traffic.

12. The base station of claim 11, wherein a softer handover is being performed on a downlink.

13. The base station of claim 11, wherein a softer handover is being performed on an uplink.

14. The base station of claim 11, wherein said first signal interface flexibly couples said resources of said signal processing unit with said resources of said transmit unit and said receive unit.

15. The base station of claim 14 further comprising a second signal interface coupled between said RF signal processing unit and said transmit unit and said receive unit of said baseband signal processing unit for flexibly allocating resources of said RF signal processing unit to any resource of said transmit unit and said receive unit.

16. The base station of claim 1 or 15, wherein said RF signal processing unit comprises a plurality of RF signal processing sub-units, with each of said plurality of RF signal processing sub-units corresponding to a respective sector.

* * * * *

UNITED STATES PATENT AND TRADEMARK OFFICE
CERTIFICATE OF CORRECTION

PATENT NO. : 6,400,966 B1
DATED : June 4, 2002
INVENTOR(S) : Andersson et al.

It is certified that error appears in the above-identified patent and that said Letters Patent is hereby corrected as shown below:

<u>Title page,</u>
Item [73], replace "Telefonaktie Bolaget" with -- Telefonaktiebolaget --

<u>Column 3,</u>
Line 25, replace "intended," with -- intended --

<u>Column 12,</u>
Line 11, replace "claim 11" with -- claim 2 --
Line 13, replace "claim 11" with -- claim 2 --
Line 15, replace "claim 11" with -- claim 2 --

Signed and Sealed this

Twelfth Day of November, 2002

*Attest:*

*Attesting Officer*

JAMES E. ROGAN
*Director of the United States Patent and Trademark Office*